United States Patent
Porat (10) Patent No.: US 9,706,432 B2
(45) Date of Patent: Jul. 11, 2017

(54) METHOD AND A SYSTEM FOR CONTROLLING TRAFFIC CONGESTION IN A NETWORK

(75) Inventor: Hayim Porat, Tel-Aviv (IL)

(73) Assignee: TEJAS NETWORKS LIMITED, Bangalore (IN)

(*) Notice: Subject to any disclaimer, the term of this patent is extended or adjusted under 35 U.S.C. 154(b) by 24 days.

(21) Appl. No.: 14/008,079

(22) PCT Filed: Aug. 11, 2011

(86) PCT No.: PCT/IN2011/000535
§ 371 (c)(1),
(2), (4) Date: Sep. 27, 2013

(87) PCT Pub. No.: WO2012/131694
PCT Pub. Date: Oct. 4, 2012

(65) Prior Publication Data
US 2014/0016472 A1    Jan. 16, 2014

(30) Foreign Application Priority Data
Mar. 31, 2011   (IN) .......................... 1079/CHE/2011

(51) Int. Cl.
*H04W 28/02* (2009.01)

(52) U.S. Cl.
CPC ... *H04W 28/0289* (2013.01); *H04W 28/0231* (2013.01)

(58) Field of Classification Search
None
See application file for complete search history.

(56) References Cited

U.S. PATENT DOCUMENTS

| | | | | |
|---|---|---|---|---|
| 5,999,103 A * | 12/1999 | Croslin | | 370/228 |
| 6,269,401 B1 * | 7/2001 | Fletcher et al. | | 709/224 |
| 7,864,704 B2 * | 1/2011 | Lee et al. | | 370/254 |
| 8,107,949 B1 * | 1/2012 | Wang | | 455/423 |
| 8,279,754 B1 * | 10/2012 | Minei et al. | | 370/230 |
| 8,762,939 B1 * | 6/2014 | Ulug et al. | | 717/109 |
| 2002/0013831 A1 * | 1/2002 | Astala et al. | | 709/220 |
| 2003/0055931 A1 * | 3/2003 | Cravo De Almeida et al. | | 709/223 |
| 2003/0107991 A1 * | 6/2003 | Tezuka et al. | | 370/229 |
| 2003/0202506 A1 * | 10/2003 | Perkins et al. | | 370/352 |
| 2003/0235157 A1 * | 12/2003 | Boivie et al. | | 370/254 |
| 2005/0003763 A1 * | 1/2005 | Lastinger et al. | | 455/63.1 |

(Continued)

*Primary Examiner* — Bunjob Jaroenchonwanit
(74) *Attorney, Agent, or Firm* — Brundidge & Stanger, P.C.

(57) ABSTRACT

The present invention relates to a method for controlling traffic congestion in a network, the network comprising a plurality of nodes including a source node, intermediary nodes and a destination node. In one embodiment, this can be accomplished by collecting network topology information and various parameters from each nodes in the network, storing the collected information and parameters in a database, computing network statistics from at least one of the contemplated collected information thereby reflecting the probabilities of changing modulation at a specific state, computing optimal parameters of specific congestion mitigation mechanisms associated with the plurality of nodes and configuring each node's specific congestion mitigation mechanism, wherein for each mechanism the method calculates the optimal parameter configuration per node.

8 Claims, 4 Drawing Sheets

(56) References Cited

U.S. PATENT DOCUMENTS

| | | | |
|---|---|---|---|
| 2006/0099954 A1* | 5/2006 | Henderson et al. | 455/447 |
| 2006/0133405 A1* | 6/2006 | Fee | 370/437 |
| 2006/0149851 A1* | 7/2006 | Matsumoto et al. | 709/238 |
| 2006/0153496 A1* | 7/2006 | Tanobe et al. | 385/24 |
| 2007/0008884 A1* | 1/2007 | Tang | 370/230 |
| 2007/0033286 A1* | 2/2007 | Min | 709/228 |
| 2007/0121542 A1* | 5/2007 | Lohr et al. | 370/329 |
| 2007/0127475 A1* | 6/2007 | Kuchibhotla et al. | 370/390 |
| 2008/0049629 A1* | 2/2008 | Morrill | 370/250 |
| 2008/0049637 A1* | 2/2008 | Morrill et al. | 370/252 |
| 2008/0056125 A1* | 3/2008 | Kneckt et al. | 370/229 |
| 2008/0102772 A1* | 5/2008 | Gandhi | 455/187.1 |
| 2008/0165901 A1* | 7/2008 | Krupka | 375/340 |
| 2008/0219366 A1* | 9/2008 | Lau et al. | 375/260 |
| 2008/0310391 A1* | 12/2008 | Schneidman et al. | 370/349 |
| 2009/0052423 A1* | 2/2009 | Aghvami et al. | 370/338 |
| 2009/0157409 A1* | 6/2009 | Lifu et al. | 704/260 |
| 2009/0219863 A1* | 9/2009 | Sen et al. | 370/329 |
| 2010/0061484 A1* | 3/2010 | Li et al. | 375/316 |
| 2010/0208601 A1* | 8/2010 | Loher | 370/252 |
| 2011/0078227 A1* | 3/2011 | McAloon et al. | 709/201 |
| 2011/0134845 A1* | 6/2011 | Henderson et al. | 370/328 |
| 2011/0149087 A1* | 6/2011 | Jeong et al. | 348/207.1 |
| 2011/0223856 A1* | 9/2011 | Ozaki | H01Q 1/3233 455/11.1 |
| 2011/0261695 A1* | 10/2011 | Zhao et al. | 370/232 |
| 2011/0276699 A1* | 11/2011 | Pedersen | 709/227 |
| 2012/0016820 A1* | 1/2012 | Walker | 706/12 |
| 2012/0020213 A1* | 1/2012 | Horneman et al. | 370/231 |
| 2012/0087243 A1* | 4/2012 | Jiang et al. | 370/235 |
| 2012/0134260 A1* | 5/2012 | Chou et al. | 370/225 |
| 2012/0202491 A1* | 8/2012 | Fox et al. | 455/435.1 |
| 2012/0294611 A1* | 11/2012 | Adler et al. | 398/45 |
| 2013/0108259 A1* | 5/2013 | Srinivas et al. | 398/25 |
| 2013/0135992 A1* | 5/2013 | Callejo Rodriguez et al. | 370/228 |
| 2014/0160939 A1* | 6/2014 | Arad et al. | 370/237 |
| 2014/0379934 A1* | 12/2014 | Brooks | 709/228 |

* cited by examiner

METHOD AND A SYSTEM FOR CONTROLLING TRAFFIC CONGESTION IN A NETWORK

FIELD OF THE INVENTION

The present invention relates to data communications in general and, in particular, to use adaptive coding and modulation schemes to control data throughput over a communication network.

BACKGROUND OF THE INVENTION

Service providers may desire to use communication systems to provide high availability to high-quality services for their subscribers. Typically, conditions differ across regions of the network, for example, due to differences in weather, geography, density of structures, density of data terminals, etc. These different network conditions may result in differences in apparent availability or quality of services to subscribers.

Adaptive communication techniques, like adaptive coding and modulation ("ACM"), may dynamically adjust coding and modulation schemes to adapt to these changing network conditions. For example, as conditions change, the availability of services may be increased or maintained by using more reliable (lower order) coding and modulation schemes. In order to adapt, however, the network may first have to detect information relating to one or more conditions. As such, there may be a delay between a change in network conditions and an adjustment in communications.

In another scenario, where adaptive channels are introduces to high speed communication networks which render simple flow-control mechanism and/or algorithms. These approaches are insufficient especially in scenarios of rapid changes in user data throughput as simple pause or flow control mechanism Pause is a flow control mechanism on full duplex Ethernet link segments defined by IEEE 802.3x and uses MAC control frames to carry the PAUSE commands. Simply placing a receiver can generate a MAC control frame and send a PAUSE request to a sender when it predicts the option for buffer overflow. Upon receiving a PAUSE frame, the sender responds by stopping transmission of any new packets until the receiver is ready to accept them again. The basic disadvantage of IEEE 802.3x PAUSE is it limits its field of applicability. After a link is paused, a sender cannot generate any more packets, which makes an Ethernet segment unsuitable for carrying multiple traffic flow that might require different quality of service (QoS). It also leads to another problem, when two nodes try to send to the same receiver, where one sender floods the link and other conservatively uses it. The receiver has to send PAUSE frames to both transmitters. The conservative sender also has to pause the transmission.

Another improvement mechanism over the pause mechanism is Priority Flow Control (PFC). Operation of priority based flow control is limited to a data center environment. Further the priority flow control mechanisms are limited to certain networks and distance. A receiver using PFC must predict the potential for buffer exhaustion for a CoS, and respond by generating an explicit PAUSE frame for that CoS when that condition arises. The PAUSE frame needs to be sent back to the other end of the wire early enough, so that the talkative sender has time to stop transmitting before buffers overflow on the receiving side. Since bits on a wire travel at a finite speed, the length of the wire affects how early the receiving end must act. The longer the wire, the earlier a receiver must send back a PAUSE frame. Put another way, at any point in time the receiver must have enough residual buffers available to store any packet that might be in flight while the PAUSE frame travels back to the sender and gets processed there. Since after the PAUSE request has been sent, the system "transmitter+wire+receiver" must drain all existing packets into receiver buffers, the definition of an appropriate buffer threshold on the receiver side is critical to a functioning PFC implementation.

Another important factor is consideration of link utilization. Defining the appropriate receiver buffer threshold for a PAUSE frame helps establish the appropriate minimum amount of buffer space required to obtain lossless behavior. If insufficient buffers are reserved for PAUSE absorption, some packets may be dropped. However, if a PAUSE is injected too early, that may affect the overall utilization of the link. Link utilization is a function of the number of packets that can be on the wire at any point in time. Since the PFC implementations do not allow configurations that can influence this parameter.

Thus, it may be desirable to generate predictions of future link conditions and to dynamically pre-adjust transmission parameters with an awareness of those predicted conditions when configuring devices for lossless Ethernet and PFC.

SUMMARY OF THE INVENTION

An aspect of the present invention is to address at least the above-mentioned problems and/or disadvantages and to provide at least the advantages described below.

Accordingly, an aspect of the present invention is to provide a method for ensuring and improving QoS (quality of service) by controlling traffic congestion in a network, the network comprising a plurality of nodes including a source node, intermediary nodes and a destination node, the method comprising, collecting network topology information and various parameters from each nodes in the network, storing the collected information and parameters in a database, computing network statistics from at least one of the contemplated collected information thereby reflecting the probabilities of changing modulation at a specific state, computing optimal parameters of specific congestion mitigation mechanisms associated with the plurality of nodes and configuring each node's specific congestion mitigation mechanism, wherein for each mechanism the method calculates the optimal parameter configuration per node.

In accordance with another aspect of the present invention provide a network node, comprising a processor and a plurality of memory including one or more modules coupled to the processor, wherein the processor is configured for, collecting network topology information and various parameters from each nodes in the network, storing the collected information and parameters in a database, computing network statistics from at least one of the contemplated collected information thereby reflecting the probabilities of changing modulation at a specific state, computing optimal parameters of specific congestion mitigation mechanisms associated with the plurality of nodes and configuring each node's specific congestion mitigation mechanism, wherein for each mechanism the method calculates the optimal parameter configuration per node.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings in which.

Persons skilled in the art will appreciate that elements in the figures are illustrated for simplicity and clarity and may have not been drawn to scale. For example, the dimensions of some of the elements in the figure may be exaggerated relative to other elements to help to improve understanding of various exemplary embodiments of the present disclosure.

Throughout the drawings, it should be noted that like reference numbers are used to depict the same or similar elements, features, and structures.

DETAIL DESCRIPTION OF THE INVENTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such claimed matter may be practiced without these specific details. In other instances, well-known structures and devices are shown in block diagram form in order to facilitate describing the claimed subject matter.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Automated reasoning systems (e.g., explicitly and/or implicitly trained generative and discriminatory classifiers) can be employed in connection with performing inference and/or probabilistic determinations and/or statistical-based determinations as in accordance with one or more aspects of the claimed subject matter as described hereinafter. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, HMMs, Markov processes, neural networks, graphical probabilistic models, such as Bayesian networks, dynamic Bayesian networks, and continuous time Bayesian networks, logic-based reasoning systems, and fuzzy logic) can be employed in connection with performing automatic and/or inferred action in connection with the claimed subject matter.

Furthermore, the claimed subject matter may be implemented as a method, apparatus, or article of manufacture using standard programming and/or engineering techniques to produce software, firmware, hardware, or any combination thereof to control a computer to implement the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 1:
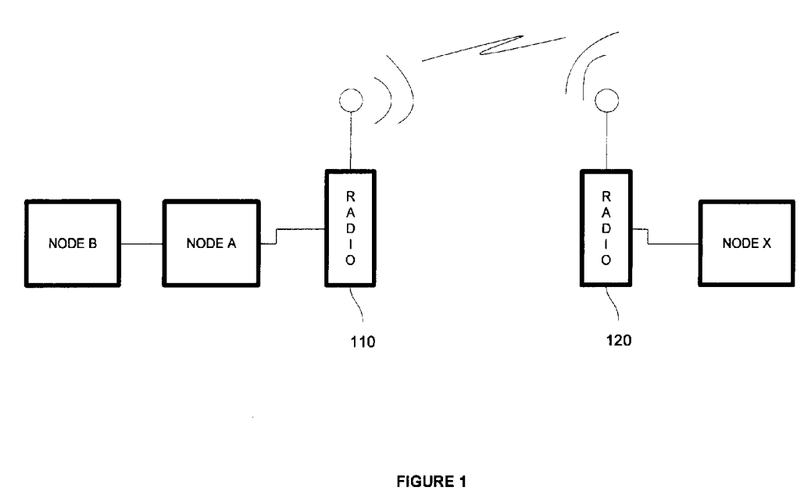
FIG. 1 shows an example of a system connecting two radio antennae connected via a medium.

Referring to FIG. 1 shows a system includes a radio communication link that can be employed to facilitate communications between the Node A and the Node X. At least two nodes in the network include a radio transmitting device with an adaptive transmission channel The Node A is operably connected to one or more Node X to transmit traffic from one network to the other network. Similarly, the Node X may also be operably connected to one or more other Nodes (not shown in figure) that can be employed to transmit and receive traffic.

The medium between the two nodes has to be constantly watched for efficient data transmission. The data signal deteriorates based on the environment condition (e.g. winter), a constant watch as well as prediction is so important in data communication network. Based on the prediction, the data can be dynamically controlled to ensure QoS (quality of service) while maintaining maximum network utilization thus enabling optimal network utilization.

Figure 2:
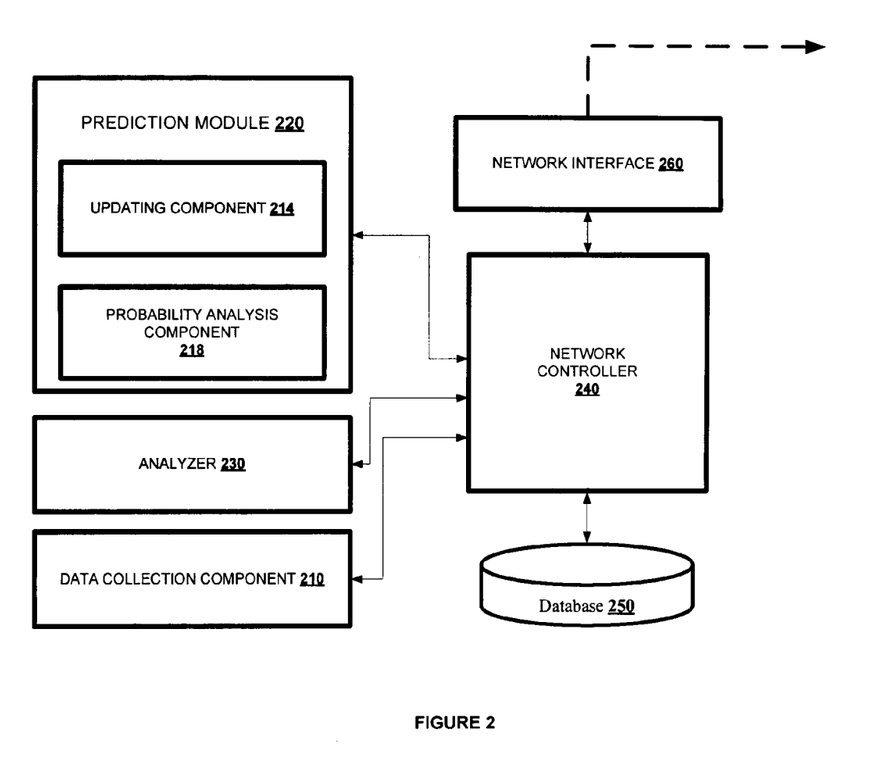
FIG. 2 shows a system for controlling traffic congestion in a network according to one embodiment of the present invention.

FIG. 2 shows a system for controlling traffic congestion in a network according to one embodiment of the present invention. The system may include a plurality of nodes i.e. a source node, intermediary nodes and a destination node. Each node in the system has a data collection component 210, at least one prediction module 220, an analyzer 230, a network controller 240, a database 250 and a network interface 260. The prediction module 220 further includes an updating component 224 and a probability analysis component 228.

In an example embodiment, all the modules and components are in communication with the network controller 240. The data collection component 210 is capable of collection network topology information and various parameters from each node in the network. The collected information may be or may include but not limited to length of links, buffer sizes at each device, type of congestion control mechanisms available, modulation used, time stamp of each event in modulation.

The prediction module 220 has the capability of predicting the probability of a status change of the network medium based on collected parameters. Also, the prediction module in communication with the network controller computes the network statistics from at least one of the contemplated collected information thereby reflecting the probabilities of changing modulation at a specific state. The updating component 224 has the capability of updating the network medium information dynamically. The probability analysis component 228 has the capability of analyzing the occurrence of medium status based on the specific parameters. In combination with the updated information received from the updating components and also using the probability theory, the prediction module capable of predicting the medium condition for the next few hours or days. Also, the prediction module 220 has the capability of calculating per node and per radio link to reflect the probabilities of changing modulation at a given specific state.

The analyzer module 230 is also communicably coupled to the network controller 240 for analyzing the prediction. The analyzer module compares outputs predicted by the predictive model component with actual events, builds a case library of predicted situations and their accuracy, and uses the library to tune and/or annotate base level inferences so as to relay a reliability of the base level inference. Based on the analyzes, the analyzer module defines the threshold associated with other plurality of nodes connected in the network.

The database 250 in communication with the network controller 240 stores the collected information and parameters for future reference and comparisons. The database also helps in comparing optimal parameters which helps in reconfiguring the nodes based on the new parameters. Optimal parameters will be computed to ensure that even though network capacity had deteriorated, QoS and SLA (service level agreement) are ensured, while maximum network utilization is maintained to ensure optimal usage of the network (with no over engineering of network resources or over policing of flows)

The network interface 260 in communication with the network controller 240 configures each node with the parameters specific to the congestion mitigation mechanism, wherein for each mechanism the method calculates the optimal parameter configuration per node. The congestion controls mechanism includes but not limited to priority flow control, FCoE, BNC etc.

The system further configured to various modules (not shown in figure) for collecting adaptive channel modulation data in predetermined intervals or ad hoc (e.g. SNMP traps). Also, the system observes each node if there is any change in the network condition thereby updating the observed data in the data base for computing optical parameters.

Figure 3:
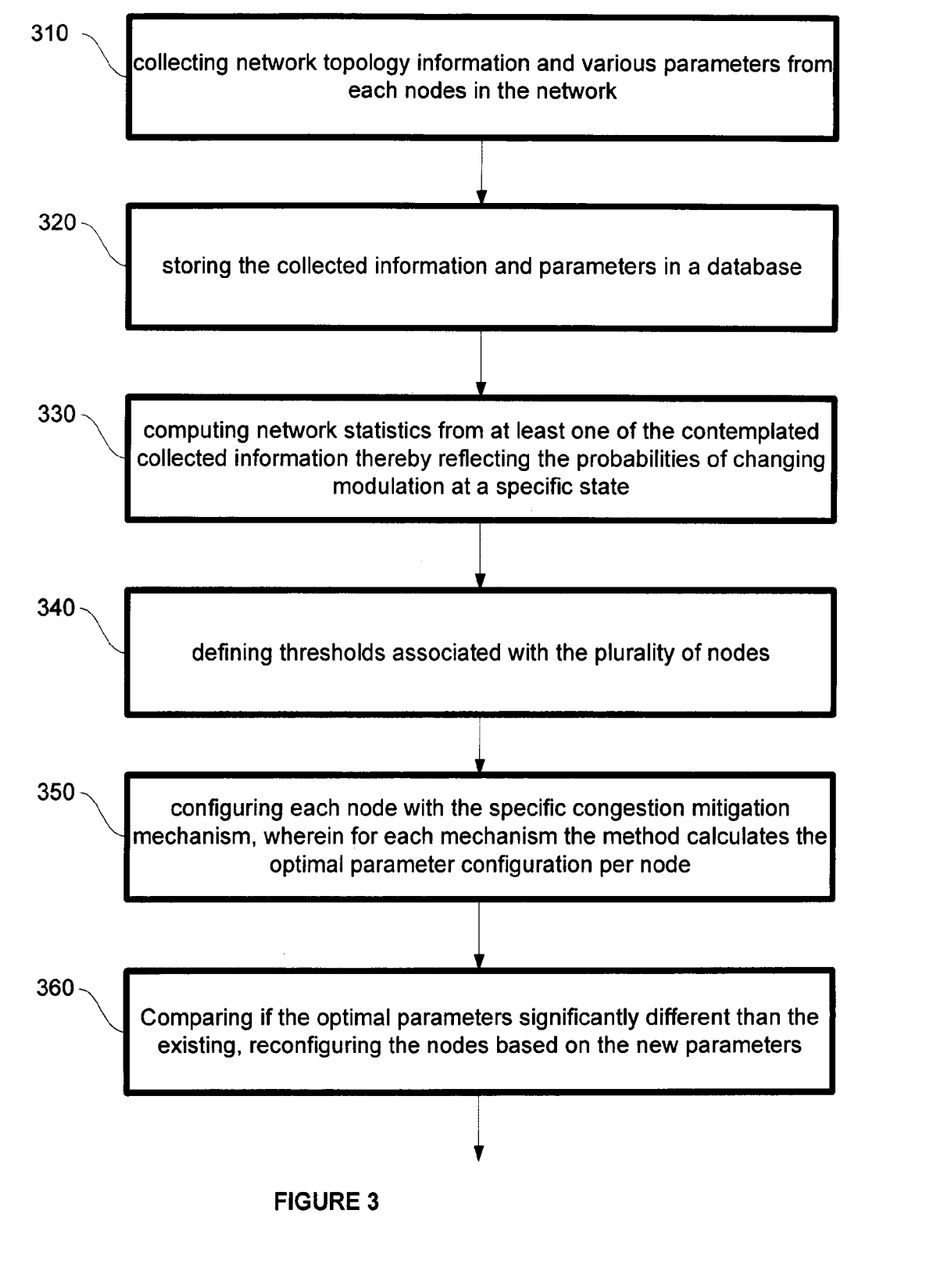
FIG. 3 shows a flow chart of a method for controlling traffic congestion in a network, the network comprising a plurality of nodes including a source node, intermediary nodes and a destination node, according to one embodiment of the present invention.

FIG. 3 shows a flow chart of a method for controlling traffic congestion in a network that uses an exemplary Priority Flow Control as a congestion mitigation mechanism, the network comprising a plurality of nodes including a source node, intermediary nodes and a destination node, according to one embodiment of the present invention. The method begins at step 310, where the method collects network topology information and various parameters from each nodes in the network. The collected information includes but not limited to length of links, buffer sizes at each device, type of congestion control mechanisms available, modulation used, time stamp of each event in modulation, etc.

At step 320, the method stores the collected information and parameters in a database for comparison and for future references.

At step 330, the method computes network statistics from one or more of the contemplated collected information thereby reflecting the probabilities of changing modulation at a specific state. The computing network statistics includes calculating per radio link to reflect the probabilities of changing modulation at a given specific state.

At step 340, the method defines thresholds associated with the plurality of nodes. The nodes maintain at each output port, a queue per class where each class has a threshold of its own. When the receiving queue goes above the threshold a pause frame is sent to the controller for pausing the specific queue. Defining threshold is based on the probability calculation for switching to low or high modulation scheme. For an example, after statistical gathering, the module suggests that the signal deteriorates during winter, it is more likely to continue deteriorate than to recover. So at winter period, the system is now reconfigured with lower threshold per class to ensure better reaction time.

At step 350, the method based on the above collected and calculation information, the method configures each node with the specific threshold per class per radio link.

At step 360, the method compares if the optimal parameters predicted from the medium are significantly different than the existing according to a predefined criteria defined by the user, reconfiguring the nodes based on the new parameters, only if the parameters are different and above a pre-defined threshold defined by the user.

In addition of all the above steps, the method also collects adaptive channel modulation data, either ad hoc (e.g. SNMP traps) or in predetermined intervals, observes each node if there is any change in the network condition and thereby updates the observed data in the data base for computing optical parameters.

Although the method flowchart includes steps 310-360 that are arranged logically in the exemplary embodiments, other embodiments of the subject matter may execute two or more steps in parallel, using multiple processors or a single processor organized as two or more virtual machines or sub-processors. Moreover, still other embodiments may implement the steps as two or more specific interconnected hardware modules with related control and data signals communicated between and through the modules, or as portions of an application-specific integrated circuit. Thus, the exemplary process flow diagrams are applicable to software, firmware, and/or hardware implementations.

Figure 4:
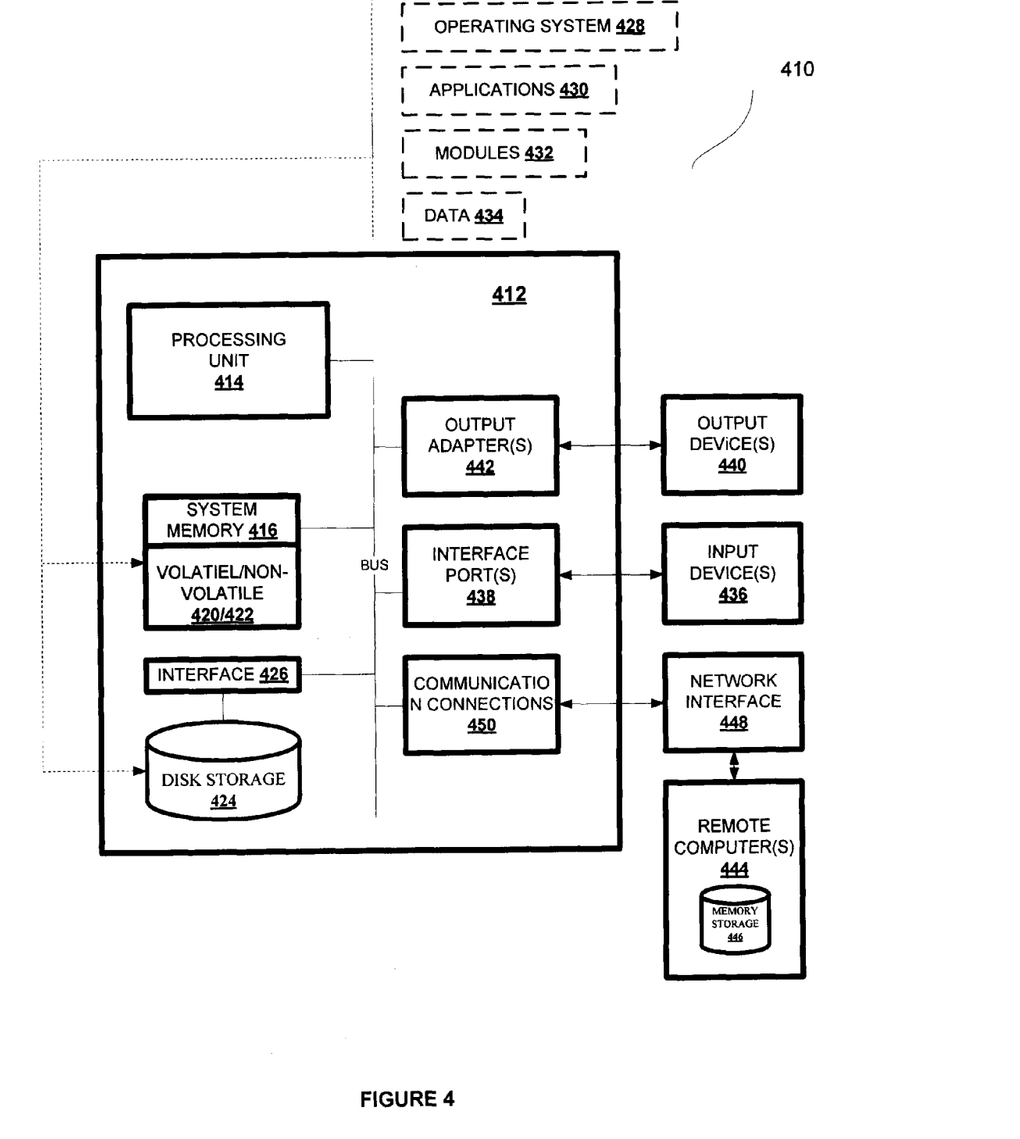
FIG. 4 shows a schematic block diagram illustrating a suitable operating environment.

With reference to FIG. 4, an exemplary environment 410 for implementing various aspects of the invention includes a computer 412. The computer 412 includes a processing unit 414, a system memory 416, and a system bus 418. The system bus 418 couples system components including, but not limited to, the system memory 416 to the processing unit 414. The processing unit 414 can be any of various available processors. Dual microprocessors and other multiprocessor architectures also can be employed as the processing unit 414.

The system bus 418 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 416 includes volatile memory 420 and nonvolatile memory 422. The basic input/output system (BIOS), containing the basic routines to transfer information between elements within the computer 412, such as during start-up, is stored in nonvolatile memory 422. By way of illustration, and not limitation, nonvolatile memory 422 can include read only memory (ROM), programmable ROM (PROM), electrically programmable ROM (EPROM), electrically erasable ROM (EEPROM), or flash memory. Volatile memory 420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 412 also includes removable/nonremovable, volatile/nonvolatile computer storage media disk storage 424. The disk storage 424 includes, but is not limited to, devices like a magnetic disk drive, floppy disk drive, tape drive, Jaz drive, Zip drive, LS-100 drive, flash memory card, or memory stick. In addition, disk storage 424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 424 to the system bus 418, a removable or non-removable interface is typically used such as interface 426.

It is to be appreciated that FIG. 4 describes software that acts as an intermediary between users and the basic computer resources described in suitable operating environment 410. Such software includes an operating system 428. Operating system 428, which can be stored on disk storage 424, acts to control and allocate resources of the computer system 412. System applications 430 take advantage of the management of resources by operating system 428 through program modules 432 and program data 434 stored either in system memory 416 or on disk storage 424. It is to be appreciated that the subject invention can be implemented with various operating systems or combinations of operating systems.

A user enters commands or information into the computer 412 through input device(s) 436. Input devices 436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 414 through the system bus 418 via interface port(s) 438. Interface port(s) 438 include, for example, a serial port, a parallel port, a game port, and a universal serial bus (USB). Output device(s) 440 use some of the same type of ports as input device(s) 436. Thus, for example, a USB port may be used to provide input to computer 412, and to output information from computer 412 to an output device 440. Output adapter 442 is provided to illustrate that there are some output devices 440 like monitors, speakers, and printers among other output devices 440 that require special adapters. The output adapters 442 include, by way of illustration and not limitation, video and sound cards that provide a means of connection between the output device 440 and the system bus 418. It should be noted that other devices and/or systems of devices provide both input and output capabilities such as remote computer(s) 444.

Computer 412 can operate in a networked environment using logical connections to one or more remote computers, such as remote computer(s) 444. The remote computer(s) 444 can be a personal computer, a server, a router, a network PC, a workstation, a microprocessor based appliance, a peer device or other common network node and the like, and typically includes many or all of the elements described relative to computer 412. For purposes of brevity, only a memory storage device 446 is illustrated with remote computer(s) 444. Remote computer(s) 444 is logically connected to computer 412 through a network interface 448 and then physically connected via communication connection 450. Network interface 448 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 450 refers to the hardware/software employed to connect the network interface 448 to the bus 418. While communication connection 450 is shown for illustrative clarity inside computer 412, it can also be external to computer 412. The hardware/software necessary for connection to the network interface 448 includes, for exemplary purposes only, internal and external technologies such as, modems including regular telephone grade modems, cable modems and DSL modems, ISDN adapters, and Ethernet cards.

FIGS. 1-4 are merely representational and are not drawn to scale. Certain portions thereof may be exaggerated, while others may be minimized. FIGS. 1-4 illustrate various embodiments of the invention that can be understood and appropriately carried out by those of ordinary skill in the art.

In the foregoing detailed description of embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the detailed description of embodiments of the invention, with each claim standing on its own as a separate embodiment.

It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively.

I claim:

1. A method for controlling traffic congestion in a network, the network comprising a plurality of interconnected nodes including a source node, intermediary nodes and a destination node, wherein at least two nodes with congestion mitigation mechanism that are connected with at least one link, said link using adaptive modulation mechanism, the method comprising:
    collecting at least buffer sizes at each device, type of congestion control mechanisms available, modulation used, and time stamp of each event in modulation from each node in the network;
    storing the at least buffer sizes at each device, type of congestion control mechanisms available, modulation used, and time stamp of each event in modulation collected from each node in the network as collected information and parameters in a database;
    computing network statistics from at least one of the contemplated collected information thereby reflecting the probabilities of changing modulation at a specific state, wherein computing network statistics includes calculating per radio link to reflect probabilities of changing modulation at a given specific state;
    computing optimal parameters of specific congestion mitigation mechanisms associated with the plurality of nodes;
    configuring each node's specific congestion mitigation mechanism, wherein for each mechanism the method calculates the optimal parameter configuration per node;
    collecting adaptive channel modulation data in predetermined intervals or ad-hoc;
    observing at each node if there is any change in the network condition; and
    updating the observed data in the data base for computing optical parameters.

2. The method of claim 1, further comprising:
    determining whether the optimal parameters differ from the existing, reconfiguring the nodes based on the new parameters.

3. The method of claim 1, wherein the adaptive channel modulation data includes data from at least one Simple Network Management Protocol (SNMP) trap.

4. The method of claim 1, wherein the congestion controls mechanism includes a priority flow control mechanism.

5. The method of claim 1, wherein the step of computing network statistics includes calculating per node and per radio link to reflect the probabilities of changing modulation at a given specific state.

6. A network node, comprising:
    a controller; and
    a plurality of memory including one or more modules coupled to the controller;
    wherein the controller is configured for,
    collecting buffer sizes at each device, type of congestion control mechanisms available, modulation used, and time stamp of each event in modulation from each node in the network;
    storing the buffer sizes at each device, type of congestion control mechanisms available, modulation used, and time stamp of each event in modulation from each node in the network as collected information and parameters in a database;
    computing network statistics from at least one of the contemplated collected information thereby reflecting the probabilities of changing modulation at a specific state, wherein computing network statistics includes calculating per radio link to reflect probabilities of changing modulation at a given specific state;
    computing congestion mitigation parameters associated with the plurality of nodes;
    configuring each node with the specific congestion mitigation mechanism, wherein for each mechanism the method calculates the optimal parameter configuration per node;
    collecting adaptive channel modulation data in predetermined intervals or ad hoc;
    observing at each node if there is any change in the network condition; and
    updating the observed data in the data base for computing optical parameters.

7. The network node of claim 1 is at least one of a switch, a router, and a network element.

8. The network node of claim 1, wherein the adaptive channel modulation data includes data from at least one Simple Network Management Protocol (SNMP) trap.

* * * * *